(12) United States Patent
Khawaji et al.

(10) Patent No.: US 11,440,980 B2
(45) Date of Patent: Sep. 13, 2022

(54) METHODS FOR FORMING ULTRA HIGH MOLECULAR WEIGHT POLYETHYLENES AND METHODS FOR REDUCING CONTAMINANT CONTENT IN SUCH

(71) Applicant: Saudi Arabian Oil Company, Dhahran (SA)

(72) Inventors: Motaz Khawaji, Thuwal (SA); Faisal Melebari, Thuwal (SA); Hussain Al Yami, Thuwal (SA); Wei Xu, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 181 days.

(21) Appl. No.: 16/935,842

(22) Filed: Jul. 22, 2020

(65) Prior Publication Data

US 2022/0025078 A1 Jan. 27, 2022

(51) Int. Cl.
*C08F 6/02* (2006.01)

(52) U.S. Cl.
CPC .................................. *C08F 6/02* (2013.01)

(58) Field of Classification Search
CPC ............................................ C08F 6/02
See application file for complete search history.

(56) References Cited

U.S. PATENT DOCUMENTS

| | | |
|---|---|---|
| 2,738,151 A | 3/1956 | Herzog |
| 3,061,602 A | 10/1962 | Duck et al. |
| 3,686,350 A | 8/1972 | Ono et al. |
| 4,242,531 A | 12/1980 | Carter |
| 4,484,016 A | 11/1984 | Maschmeyer et al. |
| 4,528,415 A | 7/1985 | Knudsen |
| 4,532,370 A | 7/1985 | Le Quan et al. |
| 4,538,018 A | 8/1985 | Carter |
| 4,606,854 A | 8/1986 | Ozawa et al. |
| 4,615,998 A | 10/1986 | Le Quan et al. |
| 5,292,837 A | 3/1994 | Heinrich et al. |
| 5,376,706 A | 12/1994 | Barsotti et al. |
| 5,494,171 A | 2/1996 | Kazamoto et al. |
| 5,728,912 A | 3/1998 | Saqualain Haider Rizvi et al. |
| 5,792,895 A | 8/1998 | Commereuc et al. |
| 5,811,618 A | 9/1998 | Wu |
| 5,856,612 A | 1/1999 | Araki et al. |
| 5,877,376 A | 3/1999 | Commereuc et al. |
| 6,184,428 B1 | 2/2001 | Zahoor et al. |
| 6,767,975 B1 | 7/2004 | Liu |
| 7,122,497 B1 | 10/2006 | Nagy et al. |
| 7,157,532 B2 | 1/2007 | Payer et al. |
| 7,329,635 B2 | 2/2008 | Dickakian et al. |
| 7,361,623 B2 | 4/2008 | Dixon et al. |
| 7,638,597 B2 | 12/2009 | Etherton et al. |
| 7,919,569 B2 | 4/2011 | Xu et al. |
| 7,964,763 B2 | 6/2011 | Dixon et al. |
| 8,227,653 B2 | 7/2012 | Weber et al. |
| 8,252,871 B2 | 8/2012 | Aliyev et al. |
| 10,280,125 B2 | 5/2019 | Sogo et al. |
| 2003/0109766 A1 | 6/2003 | Commereuc et al. |
| 2007/0027276 A1 | 2/2007 | Cann et al. |
| 2013/0123443 A1 | 5/2013 | Siraux et al. |
| 2013/0303817 A1 | 11/2013 | Shaik et al. |
| 2014/0088331 A1 | 3/2014 | Rolland |
| 2014/0250835 A1 | 9/2014 | Prabhu et al. |
| 2015/0141605 A1 | 5/2015 | Bradin |
| 2016/0367977 A1 | 12/2016 | Shaikh et al. |
| 2017/0197892 A1 | 7/2017 | Khawaji et al. |
| 2017/0274356 A1 | 9/2017 | Cann et al. |

FOREIGN PATENT DOCUMENTS

| | | |
|---|---|---|
| CN | 101189270 A | 5/2008 |
| CN | 102807632 A | 12/2012 |
| CN | 103665201 A | 3/2014 |
| CN | 103724149 A | 4/2014 |
| CN | 107778388 A | 3/2018 |
| EP | 135441 A1 | 3/1985 |
| EP | 181954 A1 | 5/1986 |
| EP | 221206 A1 | 5/1987 |
| EP | 352856 A1 | 1/1990 |
| EP | 2738151 A1 | 6/2014 |
| RU | 2561921 C1 | 9/2015 |
| WO | 2011048527 A1 | 4/2011 |
| WO | 2012013805 A1 | 2/2012 |

(Continued)

OTHER PUBLICATIONS

Office Action dated Jan. 4, 2021 pertaining to U.S. Appl. No. 15/393,865, filed Dec. 29, 2016, 30 pgs.
International Search Report and Written Opinion dated Jul. 5, 2021 pertaining to International application No. PCT/US2021/014846 filed Jan. 25, 2021, 14 pages.
Notice of Allowance and Fee(s) Due dated Apr. 28, 2021 pertaining to U.S. Appl. No. 15/393,865, filed Dec. 29, 2016, 26 pgs.
International Search Report and Written Opinion dated Mar. 18, 2021 pertaining to International application No. PCT/US2020/059974 filed Nov. 11, 2020, 13 pgs.

(Continued)

*Primary Examiner* — Catherine S Branch

(74) *Attorney, Agent, or Firm* — Dinsmore & Shohl LLP

(57) ABSTRACT

According to one or more embodiments disclosed herein, the amount of one or more contaminants in an initial ultra high molecular weight polyethylene composition may be reduced by a method including contacting the initial ultra high molecular weight polyethylene composition with an acid to form a processed ultra high molecular weight polyethylene composition. The initial ultra high molecular weight polyethylene composition may include at least 0.02 wt. % of one or more contaminants. The contacting of the acid with the initial ultra high molecular weight polyethylene composition may be for a time, at a pressure, and at a temperature sufficient to reduce the amount of the one or more contaminants in the initial ultra high molecular weight polyethylene.

20 Claims, No Drawings

(56) References Cited

FOREIGN PATENT DOCUMENTS

| WO | 2013154446 A1 | 10/2013 |
|---|---|---|
| WO | 2015087303 A2 | 6/2015 |
| WO | 2015087304 A2 | 6/2015 |
| WO | 2015087305 A2 | 6/2015 |
| WO | 2015118462 A1 | 8/2015 |
| WO | 2017120310 A1 | 7/2017 |
| WO | 2018106764 A1 | 6/2018 |

OTHER PUBLICATIONS

ISR and Written Opinion pertaining to Application No. PCT/US2017/012299 dated Jun. 8, 2017.
ISR and Written Opinion pertaining to Application No. PCT/US2016/037366 dated Nov. 21, 2016.
Invitation to Pay Additional Search Fees and Partial Search Report Pertaining to Application No. PCTUS2016037366 dated Sep. 15, 2016.
Office Action dated Mar. 13, 2018 pertaining to U.S. Appl. No. 15/393,865.
Final Rejection dated Aug. 10, 2018 pertaining to U.S. Appl. No. 15/393,865.
International Search Report and Written Opinion dated Feb. 20, 2018 pertaining to International application No. PCT/US2017/064841.
Non-Final Office Action pertaining to U.S. Appl. No. 15/830,800 dated Oct. 19, 2018.
Office Action dated Dec. 13, 2018 pertaining to U.S. Appl. No. 15/181,923, filed Jun. 14, 2016.
International Search Report and Written Opinion pertaining to International Application No. PCT/US2018/051514 dated Jan. 3, 2019, 12 pages.
Office Action dated Jan. 11, 2019 pertaining to U.S. Appl. No. 15/393,865, filed Dec. 29, 2016.
Office Action dated Jun. 6, 2019 pertaining to U.S. Appl. No. 15/393,865, filed Dec. 29, 2016, 14 pgs.
Office Action dated May 10, 2019 pertaining to U.S. Appl. No. 15/181,923, filed Jun. 14, 2016, 16 pgs.
Office Action dated Sep. 4, 2019 pertaining to U.S. Appl. No. 15/181,923, filed Jun. 14, 2016, 13 pgs.
Office Action dated Nov. 6, 2019 pertaining to Chinese Patent Application No. 201680035981.0.
Extended European Search Report dated Dec. 20, 2019 pertaining to European Patent Application No. 19188473.3.
Final Office Action dated Feb. 5, 2020 pertaining to U.S. Appl. No. 15/181,923, filed Jun. 14, 2016, 12 pgs.
Office Action pertaining to RU2018128919 dated Feb. 27, 2020, 10 pgs.
Office Action dated Mar. 30, 2020 pertaining to U.S. Appl. No. 16/134,207, filed Sep. 18, 2018, 52 pgs.
Final Office Action dated Feb. 28, 2020 pertaining to U.S. Appl. No. 15/393,865, filed Dec. 29, 2016, 32 pgs.
Office Action dated Jul. 8, 2020 pertaining to Japanese Patent Application No. 2017-565808.
Office Action dated Aug. 10, 2020 pertaining to Singapore Patent Application No. 11201805653U.
U.S. Office Action dated Aug. 20, 2020 pertaining to U.S. Appl. No. 15/181,923, filed Jun. 14, 2016, 23 pgs.
Notice of Allowance and Fee(s) Due dated Sep. 10, 2020 pertaining to U.S. Appl. No. 16/134,207, filed Sep. 18, 2018, 21 pgs.
Obrey et al., "A Lewis Base Promoted Alkyl/Alkoxid Ligand Redistribution: Reaction of [Me2Al(µ-OCPh3]2", Organometallics 20, pp. 5119-5124, 2001.
T. Mole, "Organoaluminium Compounds—XL Reaction of Trialkylaluminiums with Dialkylaluminium Alkoxides", Australian Journal of Chemistry, Jan. 1, 1966, pp. 381-386.
Forestiere et al., "Oligomerization of Monoolefins by Homogenous Catalysts", Oil & Science and Technology—Review de l'Institute Francais du Petrole, pp. 663-664, vol. 64, No. 6, Nov. 2009.
P.D. Smith et al., "Ethylene dimerization over supported titanium alkoxides" Journal of Catalysis 105, pp. 187-198, 1987.
Al-Jaralla et al., "Part 1—Dimerization of Ethylene to Butene-1", Catalysis Today 14, pp. 1-124, 1992.
"Dimerize Ethylene to Butene-1", D. Commereuc, Y. Chauvin, J. Gaillard, Hydrocarbon Processing, International Edition (1984).
A. Hennico et al., "Butene-1 is made from ethylene", Hydrocarbon Processing, vol. 69:3 (1990)—Abstract Only.
Luann Farrell, "Developments in Linear Alpha Olefin (LAO) Comonomer Technologies for Polyethylene", Luann M. Farrell, ChemSystems PERP Program, May 2012.
Pietrzykowski et al., Reactions of methyl- and ethylaluminium compounds with alkoxyalcohols. The influence of alkoxyalcohol substituents on the structure of the complexes formed, Inorganic Chimica Acta 334, 2002, pp. 385-394, Elsevier.
Karin et al. "Removal of Trace Elemental Impurities from Polyethylene by Nitric Acid", Analytical Chemistry, vol. 47, No. 13, Nov. 1975, 4 pgs.
Office Action dated Feb. 25, 2021 pertaining to U.S. Appl. No. 15/181,923, filed Jun. 14, 2016, 36 pgs.

METHODS FOR FORMING ULTRA HIGH MOLECULAR WEIGHT POLYETHYLENES AND METHODS FOR REDUCING CONTAMINANT CONTENT IN SUCH

TECHNICAL FIELD

Embodiments of the present disclosure generally relate to polymer compositions and, more specifically, to polyethylenes.

BACKGROUND

Polyethylene is one of the most commonly used plastics. Different types of polyethylene are known, including ultra high molecular weight polyethylene. Embodiments of ultra high molecular weight polyethylene generally exhibit high impact strength and resistance to acids, alkalis, and organic solvents. Ultra high molecular weight polyethylene may be used in various applications, including in medical implants, food packaging, and performance materials, like fishing lines and bowstrings.

SUMMARY

Ultra high molecular weight polyethylene may be formed as a byproduct of the oligomerization of ethylene in the presence of an oligomerization catalyst and an anti-fouling agent. However, ultra high molecular weight polyethylene formed by such oligomerization processes may have a relatively high content of contaminants, such as metals (e.g., at least 0.02 wt. %). This relatively high contaminant content may result in discoloration which may be undesirable for use in certain applications, including medical and food packaging applications. The present disclosure relates to methods for reducing the content of contaminants in ultra high molecular weight polyethylenes by contacting the ultra high molecular weight polyethylenes with an acid. According to some embodiments, at least 50% of contaminants are removed from the ultra high molecular weight polyethylene. As such, according to one or more embodiments presently disclosed, waste byproduct polymer may be processed into a valuable end good.

According to one or more embodiments, the amount of one or more contaminants in an initial ultra high molecular weight polyethylene composition may be reduced by a method comprising contacting the initial ultra high molecular weight polyethylene composition with an acid to form a processed ultra high molecular weight polyethylene composition. The initial ultra high molecular weight polyethylene composition may comprise at least 0.02 wt. % of one or more contaminants. The contacting of the acid with the initial ultra high molecular weight polyethylene composition may be for a time, at a pressure, and at a temperature sufficient to reduce the amount of the one or more contaminants in the initial ultra high molecular weight polyethylene such that the total amount of contaminants in the processed ultra high molecular weight polyethylene composition is less than or equal to 95% by weight of the total amount of contaminants in the initial ultra high molecular weight polyethylene composition. The one or more contaminants may be chosen from titanium, aluminum, zirconium, chromium, nickel, hafnium, scandium, magnesium, boron, phosphorus, fluorine, chlorine, nitrogen, silicon, or combinations of these.

According to one or more additional embodiments, an ultra high molecular weight polyethylene may be formed by a method comprising oligomerizing ethylene in the presence of at least an oligomerization catalyst and an anti-fouling agent, forming an initial ultra high molecular weight polyethylene composition as a byproduct of the oligomerizing of the ethylene, and contacting the initial ultra high molecular weight polyethylene composition with an acid to form a processed ultra high molecular weight polyethylene composition. One or both of the oligomerization catalyst and an anti-fouling agent may comprise one or more contaminants chosen from titanium, aluminum, zirconium, chromium, nickel, hafnium, scandium, magnesium, boron, phosphorus, fluorine, chlorine, nitrogen, silicon, or combinations of these. The initial ultra high molecular weight polyethylene composition may comprise at least 0.02 wt. % of the one or more contaminants of the oligomerization catalyst, the anti-fouling agent, or both. The initial ultra high molecular weight polyethylene composition may comprise at least 0.02 wt. % of one or more contaminants. The contacting of the acid with the initial ultra high molecular weight polyethylene composition may be for a time, at a pressure, and at a temperature sufficient to reduce the amount of the one or more contaminants in the initial ultra high molecular weight polyethylene composition by at least 5 wt. %.

According to one or more yet additional embodiments, an amount of one or more contaminants in an initial ultra high molecular weight polyethylene composition may be reduced by a method that may comprise contacting the initial ultra high molecular weight polyethylene composition with an acid to form a processed ultra high molecular weight polyethylene composition, washing the processed ultra high molecular weight polyethylene composition with water, and drying the processed ultra high molecular weight polyethylene composition. Contacting of the acid with the initial ultra high molecular weight polyethylene composition may be for a time, at a pressure, and at a temperature sufficient to reduce the amount of the one or more contaminants in the initial ultra high molecular weight polyethylene such that the total amount of contaminants in the processed ultra high molecular weight polyethylene composition may be less than or equal to 95% by weight of the total amount of contaminants in the initial ultra high molecular weight polyethylene composition. The initial ultra high molecular weight polyethylene composition may comprise at least 0.02 wt. % of one or more contaminants. The acid may comprise hydrochloric acid, nitric acid, or combinations of these. Contacting the acid with the initial ultra high molecular weight polyethylene composition may occur at a temperature from 25° C. to 200° C. and pressure from ambient pressure to 60 bar. The one or more contaminants may be chosen from titanium, aluminum, or combinations of these. The processed ultra high molecular weight polyethylene composition may comprise less than or equal to 5 wt. % of the one or more contaminants.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

The detailed description discloses one or more embodiments relevant to the appended claims. One or more embodiments of the present disclosure are directed to methods for reducing the amount of one or more contaminants in an initial ultra high molecular weight polyethylene composition. In one or more embodiments, such contaminants may be remnants of catalysts or other agents present in the oligomerization reaction forming the ultra high molecular weight polyethylene composition. The methods may generally comprise contacting the initial ultra high molecular weight polyethylene composition with an acid. The contacting with the acid may form a processed ultra high molecular weight polyethylene composition. Further embodiments described herein relate to forming ultra high molecular weight polyethylenes during ethylene oligomerization and removing contaminants from such ultra high molecular weight polyethylene.

As described herein, a "polyethylene" refers to a polymer comprising a majority amount (i.e., >50 mol %) of units which have been derived from ethylene monomer. This includes polyethylene homopolymers or copolymers (meaning units derived from two or more comonomers, such as 1-butene, 1-hexene and 1-octene). One or more embodiments of polyethylenes described herein may comprise at least 60 mol. %, at least 70 mol. %, at least 80 mol. %, at least 90 mol. %, at least 95 mol. %, or even at least 99 mol. % of units which have been derived from ethylene monomer.

As described herein, an "ultra high molecular weight polyethylene" refers to a polyethylene with a molecular weight of from 1,000,000 to 10,000,000 Da. One or more embodiments of ultra high molecular weight polyethylenes may typically exhibit high strength and resistance to corrosive chemicals. Some ultra high molecular weight polyethylenes may be used in performance materials, such as fishing lines and bowstrings, and in biomaterials, such as hip, knee, and spine implants. However, the end use of the ultra high molecular weight polyethylene should not be limiting on the present disclosures.

The term "composition," as used herein, refers to a mixture of materials. For example, the ultra high molecular weight polyethylene compositions described herein may include polymers (e.g., ultra high molecular weight polyethylene) and one or more contaminants. In one or more embodiments, the ultra high molecular weight polyethylene compositions described herein may comprise at least 50 wt. % ultra high molecular weight polyethylene. For example, an ultra high molecular weight polyethylene composition may comprise at least 50 wt. %, at least 60 wt. %, at least 70 wt. %, at least 80 wt. %, at least 90 wt. % or even at least 99 wt. % ultra high molecular weight polyethylene.

As described herein, in one or more embodiments, the initial ultra high molecular weight polyethylene composition may be contacted with an acid. In one or more embodiments, the "initial" ultra high molecular weight polyethylene composition generally refers to an ultra high molecular weight polyethylene composition that has not been contacted by an acid solution such that the contaminant content of the ultra high molecular weight polyethylene composition is reduced. For example, the initial ultra high molecular weight polyethylene composition may be unprocessed, or minimally chemically processed, post reaction to form the initial ultra high molecular weight polyethylene composition. The initial ultra high molecular weight polyethylene composition may have undergone physical resizing following formation. For example, the resizing may comprise increasing the surface area to volume ratio by, for example, particulating the ultra high molecular weight polyethylene composition. In one or more embodiments, the initial ultra high molecular weight polyethylene composition may comprise additional impurities that are not removed from the initial ultra high molecular weight polyethylene during the contacting with an acid.

In one or more embodiments, the initial ultra high molecular weight polyethylene composition may comprise at least 0.02 wt. % of one or more contaminants. For example, the initial ultra high molecular weight polyethylene composition may comprise at least 0.02 wt. %, at least 0.05 wt. %, at least 0.1 wt. %, at least 0.5 wt. %, at least 1 wt. %, at least 2 wt. %, at least 3 wt. %, at least 4 wt. %, or even at least 5 wt. % of one or more contaminants.

As described herein, the one or more "contaminants" may comprise metal or non-metal elements present in the initial ultra high molecular weight polyethylene composition that are not part of the polymer. For example, in one or more embodiments, the contaminants are not covalently bonded with the polymeric material. The polymeric material may generally be defined as the organic constituents which form the polymer backbone and any other groups (organic or otherwise) which are bonded to the carbon backbone. In the case of a polyethylene, the carbon backbone may be a chain of carbon atoms, and any organic groups bonded to the carbon backbone. In one or more embodiments, the polymeric material may be free of halogens.

In one or more embodiments, the one or more contaminants may be comprised of titanium, aluminum, zirconium, chromium, nickel, hafnium, scandium, magnesium, boron, phosphorus, fluorine, chlorine, nitrogen, silicon, or combinations of these. In one or more further embodiments, the one or more contaminants may be Ti, Al, or a combination of these. As is described in more detail herein, these contaminants may be present in catalysts and/or other chemicals present during the formation of the ultra high molecular weight polyethylene.

In one or more embodiments, the initial ultra high molecular weight polyethylene composition may comprise at least 0.02 wt. % Al. For example, the initial polyethylene composition may comprise at least 0.02 wt. %, at least 0.1 wt. %, at least 0.2 wt. %, at least 0.3 wt. %, at least 0.4 wt. %, or even at least 0.5 wt. % Al.

In one or more embodiments, the initial ultra high molecular weight polyethylene composition may comprise at least 0.02 wt. % Ti. For example, the initial ultra high molecular weight polyethylene composition may comprise at least 0.02 wt. %, at least 0.1 wt. %, at least 0.5 wt. %, at least 1 wt. %, at least 2 wt. %, at least 3 wt. %, at least 4 wt. %, or even at least 5 wt. % Ti.

As described herein, in one or more embodiments, the initial ultra high molecular weight polyethylene composition may be comprised of particles of the initial ultra high molecular weight polyethylene composition. In one or more embodiments, the particles of initial ultra high molecular weight polyethylene may have an approximate diameter from 0.1 to 10000 micrometers. For example, the approximate diameter of the particles of the initial ultra high molecular weight polyethylene may have a diameter from 0.1 to 10000 micrometer, from 0.1 to 9000 micrometers, from 0.1 to 8000 micrometers, from 0.1 to 7,000 micrometers, from 0.1 to 6000 micrometers, from 0.1 to 5000 micrometers, from 0.1 to 4000 micrometers, from 0.1 to 3000 micrometers, from 0.1 to 2000 micrometers, from 0.1 to 1000 micrometers, or even from 0.1 to 500 micrometers.

In one or more embodiments, the initial ultra high molecular weight polyethylene composition may comprise particles that are not perfectly spherical, but may comprise particles that are approximately spherical. Thus, particle size may be determined by the approximate diameter of the particles. In one or more embodiments, the initial ultra high molecular weight polyethylene composition may undergo physical resizing so that the approximate diameter of the particles of initial ultra high molecular weight polyethylene composition is from 0.1 to 10000 micrometers. This physical resizing may be achieved by any suitable process known to one skilled in the art.

As described herein, in one or more embodiments, the initial ultra high molecular weight polyethylene composition may be contacted with an acid. As described herein, an "acid" refers to a molecule or ion capable of donating a proton, or, alternatively, capable of forming a covalent bond with an electron pair. The acid may be contained in an acid solution. The acid solution may be a mixture of acids, or may be a mixture of one or more acids with another material such as water.

In one or more embodiments, contacting the initial ultra high molecular weight polyethylene composition with the acid may be achieved by submerging the initial ultra high molecular weight polyethylene composition in the acid to form a mixture of acid and initial ultra high molecular weight polyethylene composition. In further embodiments, contacting the initial ultra high molecular weight polyethylene composition with the acid may be achieved by any means known to one skilled in the art. For example, spraying, wetting, and other like means that are capable of occurring at a high temperature and pressure are contemplated. In one or more embodiments, the contacting of initial ultra high molecular weight polyethylene composition and acid may occur in a vessel. As described herein, a "vessel" is any container capable of holding a liquid. In one or more embodiments, the vessel may be a reactor, a tank, or any container known in the art that is capable of containing a liquid. In one or more embodiments, the vessel may be lined with any suitable material known in the art. In one or more embodiments, the vessel may be lined with PTFE. In one or more embodiments, the vessel may be at a temperature from ambient temperature to 160° C. In one or more embodiments, the vessel may be pressurized from ambient pressure to 60 bar.

In one or more embodiments, the mass ratio of the initial ultra high molecular weight polyethylene composition to the acid is from 1:1 to 1:1000. For example, the mass ratio of the initial ultra high molecular weight polyethylene composition to the acid may be from 1:1 to 1:1000, from 1:50 to 1:500, from 1:100 to 1:300, or from 1:125 to 1:250. In one or more embodiments, the ratio of initial ultra high molecular weight polyethylene composition to the acid may be from 1:150 to 1:230.

In one or more embodiments, contacting the initial ultra high molecular weight polyethylene composition with an acid may include agitating the mixture of acid and initial ultra high molecular weight polyethylene composition. The agitation of the mixture of acid and initial ultra high molecular weight polyethylene composition may be achieved by any means known in the art.

In one or more embodiments, the initial ultra high molecular weight polyethylene composition is contacted with the acid in an agitated vessel. As described herein, an agitated vessel is a vessel that comprises an apparatus suitable for mixing the contents of the vessel. For example, an agitated vessel may be a reactor fitted with a motorized impeller and internal baffles. In one or more embodiments, the initial ultra high molecular weight polyethylene composition and acid may be contacted in any suitable agitated vessel known in the art.

As described herein, in one or more embodiments, the contacting of the acid with the initial ultra high molecular weight polyethylene composition is for a time, at a pressure, and at a temperature sufficient to reduce the amount of the one or more contaminants in the initial ultra high molecular weight polyethylene composition such that the total amount of contaminants in the processed ultra high molecular weight polyethylene composition is less than or equal to 95% by weight of the total amount of contaminants in the initial ultra high molecular weight polyethylene composition. For example, the contacting of the acid with the initial ultra high molecular weight polyethylene composition is for a time, at a pressure, and at a temperature sufficient to reduce the amount of the one or more contaminants in the initial ultra high molecular weight polyethylene composition such that the total amount of contaminants in the processed ultra high molecular weight polyethylene composition is less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, or even less than or equal to 15% by weight of the total amount of contaminants in the initial ultra high molecular weight polyethylene composition.

In one or more embodiments, the contacting of the acid with the initial ultra high molecular weight polyethylene composition is for a time, at a pressure, and at a temperature sufficient to reduce the amount of the one or more contaminants in the initial ultra high molecular weight polyethylene composition such that the total amount of each contaminant in the processed ultra high molecular weight polyethylene composition is less than or equal to 95% by weight of the total amount of each contaminant in the initial ultra high molecular weight polyethylene composition. For example, the contacting of the acid with the initial ultra high molecular weight polyethylene composition is for a time, at a pressure, and at a temperature sufficient to reduce the amount of the one or more contaminants in the initial ultra high molecular weight polyethylene composition such that the total amount of each contaminant in the processed ultra high molecular weight polyethylene composition is less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, or even less than or equal to 15% by weight of the total amount of each contaminant in the initial ultra high molecular weight polyethylene composition.

Generally, in one or more embodiments, the time, pressure and temperature required to reduce the amount of one or more contaminants in the initial ultra high molecular weight polyethylene composition vary depending on the morphology of the initial ultra high molecular weight polyethylene composition; the particle size of the initial ultra high molecular weight polyethylene composition; the amount of the one or more contaminants in the initial ultra high molecular weight polyethylene composition; the acid used; and the concentration of the acid used.

In one or more embodiments, the contacting of the acid with the initial ultra high molecular weight polyethylene composition occurs at ambient temperature. As described herein, "ambient temperature" refers to the temperature of the environment in a particular place (for example, about 25° C.). In one or more embodiments, when the contacting occurs at ambient temperature, the temperature at which the contacting occurs is not directly controlled by heating or cooling the environment in which the contacting takes place.

In one or more embodiments, the contacting the acid with the initial ultra high molecular weight polyethylene composition occurs at a temperature of from 20° C. to 200° C. For example, contacting the acid with the initial ultra high molecular weight polyethylene composition may occur at a temperature from 20° C. to 200° C., from 25° C. to 175° C., from 25° C. to 150° C., from 20° C. to 125° C., from 20° C. to 100° C., from 20° C. to 75° C., or even from 20° C. to 50° C. Further examples include contacting the acid with the initial ultra high molecular weight polyethylene composition at a temperature from 20° C. to 200° C., from 50° C. to 200° C., from 75° C. to 200° C., from 100° C. to 200° C., from 125° C. to 200° C., from 150° C. to 200° C., or even from 175° C. to 200° C.

In one or more embodiments, the contacting of the acid with the initial ultra high molecular weight polyethylene composition may occur at ambient pressure. As described herein, "ambient pressure" refers to the pressure of the environment in a particular place (for example, about 1.01 bar). In one or more embodiments, when the contacting occurs at ambient pressure, the pressure at which the contacting occurs is not directly controlled by pressurizing or depressurizing the environment in which the contacting takes place.

In one or more embodiments, the contacting of the acid with the initial ultra high molecular weight polyethylene composition may occur at a pressure from ambient pressure to 60 bar. For example, contacting of the acid with the initial ultra high molecular weight polyethylene composition may occur at a pressure from ambient pressure to 60 bar, from ambient pressure to 50 bar, from ambient pressure to 40 bar, from ambient pressure to 30 bar, from ambient pressure to 20 bar, from ambient pressure to 10 bar, or even from ambient pressure to 5 bar. Further examples include contacting of the acid with the initial ultra high molecular weight polyethylene composition may occur at a pressure from 5 bar to 60 bar, from 10 bar to 60 bar, from 20 bar to 60 bar, from 30 bar to 60 bar, from 40 bar to 60 bar or even from 50 bar to 60 bar.

In one or more embodiments, the contacting of the acid with the initial polyethylene composition may be for a time of from 5 seconds to 2 days. For example, the contacting of the acid with the initial polyethylene composition may be for a time of from 5 seconds to 1 hour, from 1 hour to 24 hours, or from 1 day to 2 days. Generally, the time of contact with the acid may be a function of the strength of the acid. For example, greater amounts of stronger acids in an acid solution may require shorter contact times than those required when lesser amounts of acids or weaker acids are used.

In one or more embodiments, the acid may be one or more inorganic acids. As described herein, "inorganic acids" refer to acids derived from one or more inorganic compounds that form hydrogen ions and a conjugate base when dissolved in water. Inorganic acids may also be referred to as mineral acids. Inorganic acids contemplated for use in the disclosed methods include, but are not limited to: hydrochloric acid, nitric acid, hydrofluoric acid, hydroiodic acid, hydrobromic acid, phosphoric acid, sulfuric acid, perchloric acid, hypochlorous acid, and boric acid. Generally, inorganic acids may be effective in one or more embodiments; however, varying the inorganic acid or acids used may affect the efficacy of the removal of the one or more contaminants from the initial ultra high molecular weight polyethylene composition.

In one or more embodiments, the acid solution may comprise at least 0.1 vol. % of one or more inorganic acids. For example, the acid solution may comprise at least 0.1 vol. %, at least 1 vol. %, at least 10 vol. %, at least 20 vol. %, at least 30 vol. %, at least 40 vol. %, at least 50 vol. %, at least 60 vol. %, at least 70 vol. %, at least 80 vol. %, at least 90 vol. %, or even at least 99 vol. % inorganic acids.

In one or more embodiments, the acid may be hydrochloric acid (HCl), nitric acid ($HNO_3$), or combinations of these acids. In one or more embodiments, the acid may be in solution and comprise at least 0.1 vol. % of HCl, $HNO_3$, or combinations of these acids. For example, the acid solution may comprise at least 0.1 vol. %, at least 1 vol. %, at least 10 vol. %, at least 20 vol. %, at least 30 vol. %, at least 40 vol. %, at least 50 vol. %, at least 60 vol. %, at least 70 vol. %, at least 80 vol. %, at least 90 vol. %, or even at least 99 vol. % HCl, $HNO_3$, or a combination of HCl and $HNO_3$.

In one or more embodiments, where the acid may comprise both HCl, and $HNO_3$, the volume ratio of HCl to $HNO_3$ may be from 10:1 to 1:10. For example, the volume ratio of HCl to $HNO_3$ may be from 10:1 to 1:10, from 9:1 to 1:10, from 8:1 to 1:10, from 7:1 to 1:10, from 6:1 to 1:10, from 5:1 to 1:10, from 4:1 to 1:10, from 3:1 to 1:10, from 2:1 to 1:10, or even from 1:1 to 1:10. In further examples, the volume ratio of HCl to $HNO_3$ may be from 10:1 to 1:10, from 10:1 to 1:9, from 10:1 to 1:8, from 10:1 to 1:7, from 10:1 to 1:6, from 10:1 to 1:5, from 10:1 to 1:4, from 10:1 to 1:3, from 10:1 to 1:2, or even from 10:1 to 1:1.

In one or more embodiments, a processed ultra high molecular weight polyethylene composition is formed from the initial ultra high molecular weight polyethylene composition following contact with the acid. As described herein, a "processed" ultra high molecular weight polyethylene composition generally refers to an ultra high molecular weight polyethylene composition after it has been contacted with an acid as described herein to remove some amount of metal. In one or more embodiments, the weight of one or more contaminants in the processed ultra high molecular weight polyethylene composition is less than or equal to 95% of the weight of one or more contaminants in the initial ultra high molecular weight polyethylene composition.

In one or more embodiments, the processed ultra high molecular weight polyethylene composition may comprise less than or equal to 5 wt. % of the one or more contaminants. For example, processed ultra high molecular weight polyethylene composition may comprise less than or equal to 5 wt. %, less than or equal to 4 wt. %, less than or equal to 3 wt. %, less than or equal to 2 wt. %, less than or equal to 1 wt. %, less than or equal to 0.5 wt. %, less than or equal to 0.1 wt. %, or even less than or equal to 0.02 wt. % of the one or more contaminants.

In one or more embodiments, the processed ultra high molecular weight polyethylene composition may comprise less than or equal to 5 wt. % Al. For example, the processed ultra high molecular weight polyethylene composition may comprise less than or equal to 5 wt. %, less than or equal to 4 wt. %, less than or equal to 3 wt. %, less than or equal to 2 wt. %, less than or equal to 1 wt. %, less than or equal to 0.5 wt. %, less than or equal to 0.1 wt. %, or even less than or equal to 0.02 wt. % Al.

In one or more embodiments, the processed ultra high molecular weight polyethylene composition may comprise less than or equal to 5 wt. % Ti. For example, the processed ultra high molecular weight polyethylene composition may comprise less than or equal to 5 wt. %, less than or equal to 4 wt. %, less than or equal to 3 wt. %, less than or equal to 2 wt. %, less than or equal to 1 wt. %, less than or equal to 0.5 wt. %, less than or equal to 0.1 wt. %, or even less than or equal to 0.02 wt. % Ti.

In one or more embodiments, the initial ultra high molecular weight polyethylene composition may exhibit a purple color visible to the naked eye. It is believe that such purple color is caused by the presence of one or more contaminants in the initial ultra high molecular weight polyethylene composition. In one or more embodiments, this purple color may make the initial ultra high molecular weight polyethylene composition undesirable for medical applications and for food packaging applications. In one or more embodiments, the processed ultra high molecular weight polyethylene composition may exhibit less purple color than the initial ultra high molecular weight polyethylene composition. In one or more further embodiments, the processed ultra high molecular weight polyethylene composition may exhibit no purple coloration visible to the naked eye. In the one or more embodiments in which the processed ultra high molecular weight polyethylene composition exhibits reduced or no purple coloration, the processed ultra high molecular weight polyethylene composition may be more desirable in medical applications and food packaging applications than the initial ultra high molecular weight polyethylene composition.

As described herein, one or more embodiments of a method for reducing the amount of one or more contaminants in an initial ultra high molecular weight polyethylene composition may generally comprise contacting the initial ultra high molecular weight polyethylene composition with an acid to form a processed ultra high molecular weight polyethylene composition. In one or more embodiments, the method may further comprise removing at least a portion of the acid from the processed ultra high molecular weight polyethylene composition. In one or more embodiments, the removal of acid may be achieved by filtration, decantation, centrifugation, or any other suitable separation technique known in the art.

As described herein, in one or more embodiments, the method for reducing the amount of one or more contaminants in an initial ultra high molecular weight polyethylene composition may further comprise washing the processed ultra high molecular weight polyethylene composition. In one or more embodiments, the processed ultra high molecular weight polyethylene composition may be washed after at least a portion of acid is removed from the processed ultra high molecular weight polyethylene composition. In one or more embodiments, the processed ultra high molecular weight polyethylene composition may be washed by contacting the processed ultra high molecular weight polyethylene composition with another material and separating the processed ultra high molecular weight polyethylene from the other material. In some embodiments, the other material may be water or any material suitable for removing at least a portion of the acid from the processed ultra high molecular weight polyethylene composition. In some embodiments, the duration of washing may be any amount of time suitable for removing at least a portion of acid from the processed ultra high molecular weight polyethylene. For example, washing may occur for a time from 5 seconds to 1 hour, from 1 hour to 24 hours, or from 1 day to 2 days. In one or more embodiments, the separation of the processed ultra high molecular weight polyethylene from the other material used during washing may occur by any suitable separation means known in the art.

In one or more embodiments, the method for reducing the amount of one or more contaminants in an initial ultra high molecular weight polyethylene composition may further comprise drying the processed ultra high molecular weight polyethylene composition. As described herein, "drying" refers to any means of removing moisture from a composition known in the art. In one or more embodiments, the processed ultra high molecular weight polyethylene composition may be dried in an oven or a vacuum oven. In further embodiments, the processed ultra high molecular weight polyethylene composition may be dried in an oven at a temperature of about 75° C. In one or more embodiments, the processed ultra high molecular weight polyethylene composition may be dried under vacuum in a vacuum oven at a temperature of about 75° C. Drying may also proceed in ambient conditions, referred to sometimes as passive drying.

According to one or more additional embodiments, the initial ultra high molecular weight polyethylene may be formed by a process that includes oligomerization ethylene, wherein the initial ultra high molecular weight polyethylene composition is a byproduct of the oligomerization reaction. In one or more embodiments, the oligomerization may include dimerization, trimerization, and tetramerization. Following the production of the initial ultra high molecular weight polyethylene composition as a byproduct of the oligomerization reaction, the initial ultra high molecular weight polyethylene composition may be processed by an acid treatment as described herein.

In one or more embodiments, ethylene may be oligomerized in the presence of at least an oligomerization catalyst and an anti-fouling agent. One or both of the oligomerization catalyst and an anti-fouling agent may comprise one or more elements that are considered contaminants in the initial ultra high molecular weight polyethylene composition. In the oligomerization reaction, the initial ultra high molecular weight polyethylene composition may be formed as a byproduct of the oligomerization of the ethylene. One or more elements of the oligomerization catalyst and/or the anti-fouling agent may be the contaminants which are present in the initial ultra high molecular weight polyethylene composition.

In one or more embodiments, the oligomerization catalyst may comprise one or more titanate compounds and/or aluminum compounds. While several titanate compounds may be included in the oligomerization catalyst, in some embodiments a single titanate compound may be included in the oligomerization catalyst. In one or more embodiments, the titanate compound may be an alkyl titanate. An alkyl titanate may have the structure $Ti(OR)_4$ in which R is a branched or straight chain alkyl group. In one or more embodiments, each alkyl group may comprise from 2 to 8 carbons, where each R group may be the same or different. Suitable alkyl titanates may include tetraethyl titanate, tetraisopropyl titanate, tetra-n-butyl titanate (sometimes referred to as titanium butoxide or tetrabutyl orthotitanate), 2-tetraethylhexyl titanate. In one or more embodiments, the titanate compound of the oligomerization catalyst consists of tetra-n-butyl titanate.

In one or more embodiments, the oligomerization catalyst comprises at least one titanate compound. However, it will be appreciated by one skilled in the art that other catalysts known to those skilled in the art may be equally utilized in ethylene oligomerization reactions. For example, oligomerization catalysts based on transition metal complexes such as nickel, chromium, zirconium, or other metal complexes may be used in addition to, or as a substitute for, the discussed titanate compounds.

While several aluminum compounds may be included in the oligomerization catalyst, in some embodiments, a single aluminum compound may be included. In one or more embodiments, one or more aluminum alkyl compounds may be included in the oligomerization catalyst. Aluminum alkyl compounds may have a structure of AlR'$_3$ or AlR'$_2$H, where R' is a straight chain or branched alkane comprising from 1 to 20 carbons, or an aluminoxane structure (that is, a partial hydrolysate of trialkylaluminum compounds). For example, and not by way of limitation, suitable aluminum alkyl compounds may include triethylaluminum, tripropylaluminum, tri-iso-butylaluminum, and trihexylaluminum. In one or more embodiments, the aluminum compound of the oligomerization catalyst consists of triethylaluminum.

In one or more embodiments, the anti-fouling agent may be similar or identical to those disclosed in US20170197892, which is incorporated by reference in its entirety. In such embodiments, the anti-fouling agent may comprise a structure comprising a central aluminum molecule bound to an R1 group, bound to an R2 group, and bound to an R3 group. One or more of the chemical groups R1, R2, and R3 may be anti-fouling groups comprising the structure O((CH$_2$)$_n$O)$_m$R4, where n is an integer from 1 to 20, m is an integer from 1 to 100, and R4 is a hydrocarbyl group. The chemical groups R1, R2, or R3 that do not comprise the anti-fouling group, if any, may be hydrocarbyl groups.

In additional embodiments, the anti-fouling agent may be similar or identical to those disclosed in US20160367977, which is incorporated by reference in its entirety. In such embodiments, the anti-fouling agent may be chosen from one or more of a phosphonium or phosphonium salt; a sulfonate or a sulfonate salt; a sulfonium or sulfonium salt; an ester comprising a cyclic moiety; an anhydride; a polyether; and a long-chained amine-capped compound.

EXAMPLES

The examples are representative of embodiments of the presently disclosed subject matter, and are not meant as limiting the scope of the claims.

Example 1—Acid Treatment of an Initial Ultra High Molecular Weight Polyethylene Composition Five samples of 100 mg of an initial ultra high molecular weight polyethylene composition were created. The first sample was not treated with an acid and was analyzed by inductively coupled plasma mass spectrometry (ICP-MS) to determine the amount of Al and Ti present in the sample.

Samples 2-5 were mixed with 15 mL of an acid solution each. The acid solution contained HCl and HNO$_3$ in a ratio of 0:1 for sample 2, 1:0 for sample 3, 3:1 for sample 4, and 2:1 for sample 5. Each of samples 2-5 of initial ultra high molecular weight polyethylene composition in the acid solution were left stirring overnight at room temperature under vigorous stirring conditions. Each of samples 2-5 were washed with water and dried in an oven at about 75° C. Samples 2-5 were analyzed by ICP-MS to determine the amount of Al and Ti remaining in the processed ultra high molecular weight polyethylene composition. The results of the ICP-MS analysis for the initial ultra high molecular weight polyethylene composition of sample 1 and the processed ultra high molecular weight polyethylene compositions of samples 2-5 are reported in Table 1.

TABLE 1

| Sample | Al (wt. %) | Ti (wt. %) | HCl:HNO$_3$ |
| --- | --- | --- | --- |
| Sample 1 Initial UHMWPE Composition | 0.43 | 4.42 | — |
| Sample 2 Processed UHMWPE Composition | 0.03 | 0.62 | 0:1 |
| Sample 3 Processed UHMWPE Composition | 0.09 | 2.57 | 1:0 |
| Sample 4 Processed UHMWPE Composition | 0.09 | 2.52 | 3:1 |
| Sample 5 Processed UHMWPE Composition | 0.07 | 2.32 | 2:1 |

As disclosed in Table 1, the acid treatment process can effectively remove a large portion of the contaminants from the initial ultra high molecular weight polyethylene composition. Sample 2 showed the greatest reduction in metal content which occurred when the acid solution was entirely HNO$_3$. Sample 3 showed the least metal removal which occurred when the acid solution was entirely HCl. As the ratio of HCl to HNO$_3$ decreased, the amount of metal removed from the processed ultra high molecular weight polyethylene composition increased, as displayed by the Al and Ti content of samples 4 and 5 in Table 1.

Additionally, the acid treatment process can remove discoloration from an initial ultra high molecular weight polyethylene composition. The initial ultra high molecular weight polyethylene composition of sample 1 exhibited a purple discoloration, which is undesirable. After the acid treatment process, the purple discoloration was removed from the processed ultra high molecular weight polyethylene compositions of samples 2-5.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the present invention without departing from the spirit and scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method for reducing the amount of one or more contaminants in an initial ultra high molecular weight polyethylene composition, the method comprising:
   contacting the initial ultra high molecular weight polyethylene composition with an acid to form a processed ultra high molecular weight polyethylene composition, wherein:
   the initial ultra high molecular weight polyethylene composition comprises at least 0.02 wt. % of one or more contaminants;
   the contacting of the acid with the initial ultra high molecular weight polyethylene composition is for a time, at a pressure, and at a temperature sufficient to reduce the amount of the one or more contaminants in the initial ultra high molecular weight polyethylene such that the total amount of contaminants in the processed ultra high molecular weight polyethylene composition is less than or equal to 95% by weight of the total amount of contaminants in the initial ultra high molecular weight polyethylene composition; and the one or more contaminants are selected from the group consisting of titanium, aluminum, zirconium, chromium, nickel, hafnium, scandium, magnesium, boron, phosphorus, fluorine, chlorine, nitrogen, silicon, and combinations of these.

2. The method of claim 1, wherein the acid comprises one or more inorganic acids.

3. The method of claim 2, wherein the acid comprises hydrochloric acid, nitric acid, or combinations of these.

4. The method of claim 1, wherein the contacting of the acid with the initial ultra high molecular weight polyethylene composition occurs at a temperature from 25° C. to 200° C.

5. The method of claim 1, wherein the contacting of the acid with the initial ultra high molecular weight polyethylene composition occurs at a pressure from ambient pressure to 60 bar.

6. The method of claim 1, wherein the one or more contaminants are selected from the group consisting of titanium, aluminum, and combinations of these.

7. The method of claim 1, wherein the initial ultra high molecular weight polyethylene composition comprises at least 0.02 wt. % aluminum.

8. The method of claim 1, wherein the initial ultra high molecular weight polyethylene composition comprises at least 0.02 wt. % titanium.

9. The method of claim 1, wherein the processed ultra high molecular weight polyethylene composition comprises less than or equal to 5 wt. % of the one or more contaminants.

10. The method of claim 1, wherein the processed ultra high molecular weight polyethylene composition comprises less than or equal to 5 wt. % aluminum.

11. The method of claim 1, wherein the processed ultra high molecular weight polyethylene composition comprises less than or equal to 5 wt. % titanium.

12. The method of claim 1, further comprising removing at least a portion of the acid from the processed ultra high molecular weight polyethylene composition.

13. The method of claim 12, wherein the removing of the at least a portion of the acid from the processed ultra high molecular weight polyethylene composition comprises washing the processed ultra high molecular weight polyethylene composition with water.

14. The method of claim 13, wherein the removing of the at least a portion of the acid from the processed ultra high molecular weight polyethylene composition further comprises drying the processed ultra high molecular weight polyethylene composition.

15. A method for forming an ultra high molecular weight polyethylene, the method comprising:

oligomerizing ethylene in the presence of at least an oligomerization catalyst and an anti-fouling agent, wherein one or both of the oligomerization catalyst and an anti-fouling agent comprise one or more contaminants selected from the group consisting of titanium, aluminum, zirconium, chromium, nickel, hafnium, scandium, magnesium, boron, phosphorus, fluorine, chlorine, nitrogen, silicon, and combinations of these;

forming an initial ultra high molecular weight polyethylene composition as a byproduct of the oligomerizing of the ethylene, wherein the initial ultra high molecular weight polyethylene composition comprises at least 0.02 wt. % of the one or more contaminants of the oligomerization catalyst, the anti-fouling agent, or both, and wherein the initial ultra high molecular weight polyethylene composition comprises at least 0.02 wt. % of one or more contaminants; and contacting the initial ultra high molecular weight polyethylene composition with an acid to form a processed ultra high molecular weight polyethylene composition, wherein the contacting of the acid with the initial ultra high molecular weight polyethylene composition is for a time, at a pressure, and at a temperature sufficient to reduce the amount of the one or more contaminants in the initial ultra high molecular weight polyethylene composition by at least 5 wt. %.

16. The method of claim 15, wherein the acid comprises one or more inorganic acids.

17. The method of claim 15, wherein the contacting of the acid with the initial ultra high molecular weight polyethylene composition occurs at a temperature from 25° C. to 200° C.

18. The method of claim 15, wherein the contacting of the acid with the initial ultra high molecular weight polyethylene composition occurs at a pressure from ambient pressure to 60 bar.

19. The method of claim 15, wherein the processed ultra high molecular weight polyethylene composition comprises less than or equal to 5 wt. % of the one or more contaminants.

20. A method for reducing the amount of one or more contaminants in an initial ultra high molecular weight polyethylene composition, the method comprising:

contacting the initial ultra high molecular weight polyethylene composition with an acid to form a processed ultra high molecular weight polyethylene composition, wherein:

the contacting of the acid with the initial ultra high molecular weight polyethylene composition is for a time, at a pressure, and at a temperature sufficient to reduce the amount of the one or more contaminants in the initial ultra high molecular weight polyethylene such that the total amount of contaminants in the processed ultra high molecular weight polyethylene composition is less than or equal to 95% by weight of the total amount of contaminants in the initial ultra high molecular weight polyethylene composition;

the initial ultra high molecular weight polyethylene composition comprises at least 0.02 wt. % of one or more contaminants;

the acid comprises hydrochloric acid, nitric acid, or combinations of these;

the contacting of the acid with the initial ultra high molecular weight polyethylene composition occurs at a temperature from 25° C. to 200° C. and pressure from ambient pressure to 60 bar;

the one or more contaminants are selected from the group consisting of titanium, aluminum, and combinations of these; and the processed ultra high molecular weight polyethylene composition comprises less than or equal to 5 wt. % of the one or more contaminants;

washing the processed ultra high molecular weight polyethylene composition with water; and drying the processed ultra high molecular weight polyethylene composition.

* * * * *